United States Patent

[11] 3,556,548

| [72] | Inventor | Herbert H. Aplin |
| | | 12674 Racine, Detroit, Mich. 48205 |
| [21] | Appl. No. | 820,933 |
| [22] | Filed | May 1, 1969 |
| [45] | Patented | Jan. 19, 1971 |

[54] HAND CART
3 Claims, 2 Drawing Figs.

[52] U.S. Cl. .................................................. 280/47.27
[51] Int. Cl. .................................................. B62b 1/00
[50] Field of Search .................................... 280/47.27, 47.24; 214/370

[56] References Cited
UNITED STATES PATENTS
1,719,763  7/1929  Gullborg ...................... 280/47.27
2,650,834  9/1953  Coval .......................... 280/47.27(X)

Primary Examiner—Leo Friaglia
Attorney—Cullen, Sloman & Cantor

ABSTRACT: A hand cart of an all welded construction wherein the spaced sideplates which mount the axle for a pair of wheels has secured at their forward ends a pair of laterally extending upright stop plates from whose lower ends project a pair of side supports for a load, coplanar with and secured to a central load support secured between the sideplates and projecting forwardly, and with U-shaped handle at its free ends welded to said sideplates and stop plates.

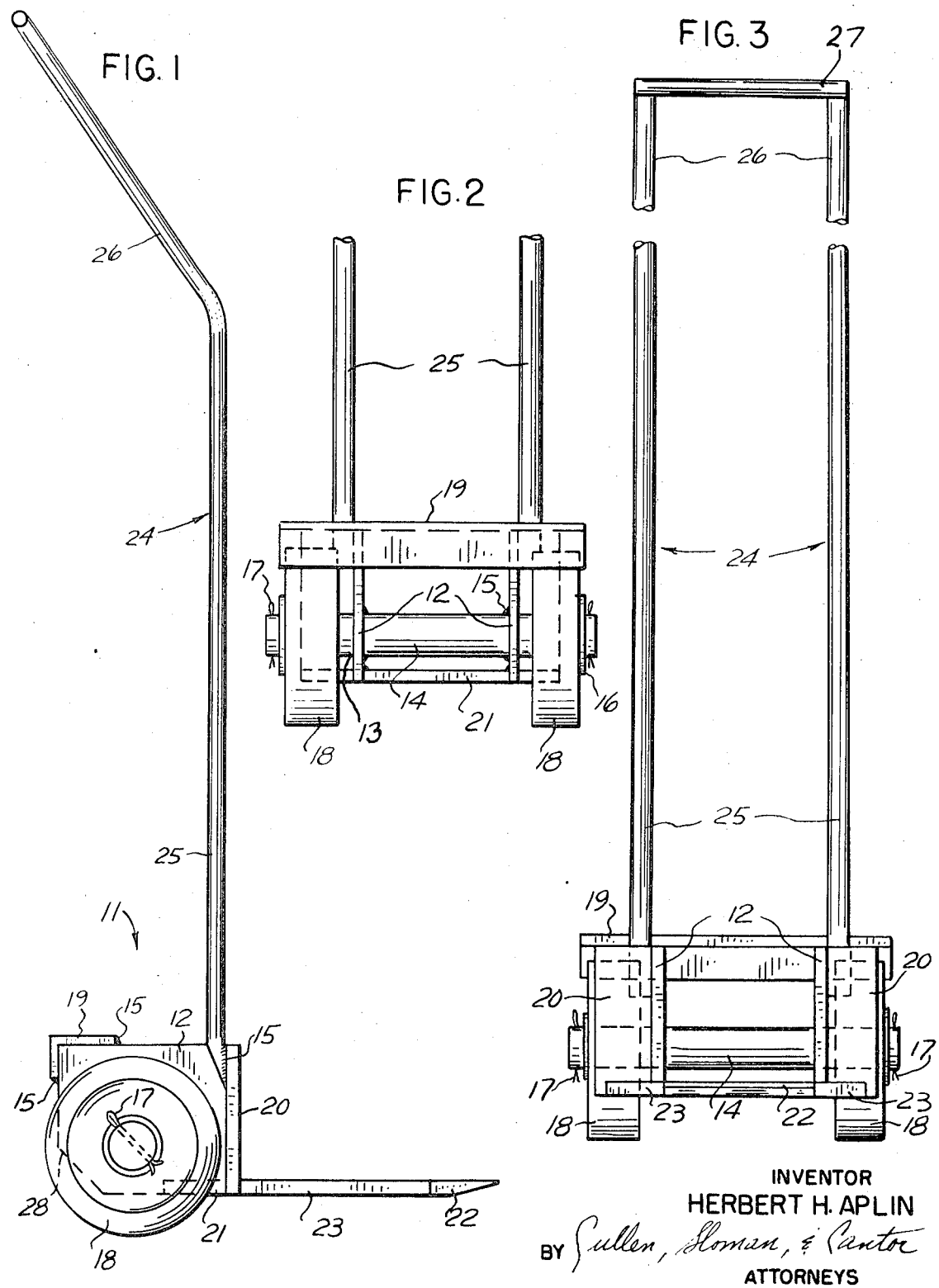

HAND CART

BACKGROUND OF INVENTION

Heretofore, hand carts of the two-wheel type of a conventional construction were involved with excessive parts and costly construction and wherein, there is a need for a simply constructed inexpensive hand cart of an all welded construction.

It is an object of the present invention to provide an improved all welded hand cart assembly of a very limited number of parts to some extent arranged in pairs for reduction of cost and a simple inexpensive assembly to provide a very useful article of manufacture.

This and other objects will be seen from the following specification and claims in conjunction with the appended drawing in which:

FIG. 1 is a side elevational view of the present hand cart;

FIG. 2 is a rear elevational view thereof; and

FIG. 3 is a front elevational view thereof.

Referring to the drawing, the present hand cart 11 includes a pair of upright sideplates 12 arranged in parallel spaced relation and apertured at 13 to receive axle shaft 14 projected therethrough and suitably secured thereto as at 15 by welding.

Washers 16 are mounted on that portion of the shaft 14 which projects outwardly of plates 12 and interposed between said washers is a conventional rubber wheel 18 retained by cotter pin 17 for illustration.

The wheel and axle assembly is conventional and no claim is made as to its specific construction since other assemblies of a similar nature for mounting wheels is contemplated.

Elongated transverse angle iron foot plate 19 overlies the upper and rear edges of the sideplates 12 and projects laterally outward thereof so as to protectively overlie the wheel assembly, as shown in FIGS. 1 and 3.

The said angle iron foot plate 19 is fixedly secured to corresponding top portions of sideplates 12 and the rear upright edges thereof as by the welds shown at 15, FIG. 1.

The pair of symmetrical upright laterally extending stop plates 20 bear against the outer forward side edges of said plates 12 and are suitably secured thereto as by welding.

Elongated work support plate 21 is interposed between sideplates 12 and is in registry with the interior lower edge portions of said sideplates and fixedly secured thereto by welds.

The work support plate 21 extends between said sideplates and also forwardly thereof as shown in FIG. 1 and terminates in the workpiece engaging tapered lip 22. Said lip extends from the front edge of the support plate and tapers downwardly and rearwardly to facilitate insertion of the said support plate below a stack of objects to be lifted thereby.

A pair of symmetrical horizontally disposed coplanar side support plates 23 are arranged to bear against the lower forward edge portions of the uprights 20 or stop plates and are fixedly secured thereto. Rear edge portions of the side support plates 23 extend laterally inward with respect to the corresponding side edge of the stop plates 20 so as to overlie and bear against the forward edges of the side plates 12 at their lower ends. By this construction, the inner side edges of the respective side support plates 23 are in registry with and coplanar with and engaging the central support plate 21 to which they are fixedly secured by suitable welds. It is noted as shown in FIG. 1 that the central support plate 21 projects forwardly of the side support plates 23; the said plates 21 and 23 cooperating for supporting a load to be transported on the present cart.

An inverted U-shaped metallic tubular handle 24 is provided whose lower free ends 25 bear against stop plates 20 and sideplates 12 where they join and are suitably secured thereto by the welds 15, FIG. 1. Upper portions of the handle 24 extend upwardly and rearwardly at 26 and terminate in the transverse bight 27.

The lower rear edges of the respective side plates 12 have cut away portions at 28 which extend upwardly and rearwardly from the lower edges of the said sideplates to provide clearance when rolling down inclines or going over steps or curbs.

The present handle construction provides a simplified manual means by which the cart may be operated with one hand leaving other hand of the user free.

The simple and compact hand cart construction above defined is particularly capable for moving along narrow pathways and for the transport of articles or stacked articles with great ease.

In the illustrative embodiment, the compact hand cart construction is approximately 11 inches in width for illustration. This cart is capable of safely handling loads up to 600 pounds for illustration. The lip 22 on support plate 23 has been cyanide hardened for a long life.

I claim:

1. A hand cart comprising:

a pair of apertured upright parallel spaced forwardly extending side plates;

an axle shaft extending through said plates, welded thereto and projecting laterally thereof mounting a pair of wheels;

an elongated angle iron foot plate spanning and welded to said sideplates at their tops and upright rear edges and extending laterally outward thereof to protectively overlie said wheels;

upright stop plates coextensive with, bearing against the upright forward outer side edges of said sideplates welded thereto and extending laterally outward thereof;

a work support plate interposed between and abutting said sideplates at their lower interior edges and welded thereto;

said support plate extending forwardly of said sideplates in a plane at right angles thereto;

a pair of additional side support plates at their rear edges abutting and coextensive with said stop plates and the front edges of said side plates and welded thereto;

said latter plates at their inner edges abutting the outer edges of said support plate and welded thereto;

said support plate extending forwardly of said side support plates;

a tubular handle of inverted U-shape with its free ends bearing against said sideplates and stop plates respectively and welded thereto; and the bight of said handle extending angularly upward and rearwardly.

2. In the hand cart of claim 1, the forward edge of said support plate on its under surface being tapered rearwardly and downwardly.

3. In the hand cart of claim 1, the lower rear edges of said sideplates being cut away rearwardly and upwardly for clearance on inclines, curbs and steps.